United States Patent [19]
Civanlar et al.

[11] Patent Number: 5,828,844
[45] Date of Patent: Oct. 27, 1998

[54] INTERNET NCP OVER ATM

[75] Inventors: Seyhan Civanlar, Middletown Township; Vikram R. Saksena, Freehold, both of N.J.

[73] Assignee: AT&T Corp., Middletown, N.J.

[21] Appl. No.: 728,276

[22] Filed: Oct. 8, 1996

[51] Int. Cl.[6] .................................................. G06F 13/00
[52] U.S. Cl. .................. 395/200.58; 370/395; 370/396; 370/400; 370/401
[58] Field of Search .............................. 395/200.6, 200.5; 370/395, 400, 401, 396

[56] References Cited

U.S. PATENT DOCUMENTS

| | | | |
|---|---|---|---|
| 5,440,547 | 8/1995 | Easki et al. | 370/395 |
| 5,461,611 | 10/1995 | Drake, Jr. et al. | 370/420 |
| 5,673,262 | 9/1997 | Shimizu | 370/395 |
| 5,673,263 | 9/1997 | Basso et al. | 370/396 |
| 5,687,168 | 11/1997 | Iwata | 370/255 |

Primary Examiner—Robert B. Harrell
Assistant Examiner—David M. Ovedovitz
Attorney, Agent, or Firm—Robert B. Levy; Stuart Mayer

[57] ABSTRACT

A telecommunications network is provided for establishing communication between at least one originating station and at least one destination station. The network includes a plurality of IP switches for addressing and routing data in accordance with an Internet protocol and an ATM protocol. A server, which is coupled to at least one of the IP switches, receives at least one service attribute requested by the originating station in communication with the IP switch. A network control point (NCP) is employed to provide data, in response to a request from the server, pertaining to the service attribute. At least one address database is associated with each of the IP switches. The address database includes a subset of the data available in the NCP.

23 Claims, 4 Drawing Sheets

INTERNET NCP OVER ATM

TECHNICAL FIELD

This invention relates generally to a method for establishing communication over a telecommunications network and more particularly to a method for establishing communications over a network incorporating IP switches.

BACKGROUND OF THE INVENTION

The recent growth of the Internet's backbone network has been facilitated by several newly emerging technologies. As this growth has continued with the deployment of many additional routers and Web servers, it has become increasingly evident that a high-speed Internet backbone is needed to allow further growth and to improve performance. One technology that can support such growth is Asynchronous Transfer Mode (ATM) protocol. ATM is a LAN/WAN networking infrastructure which provides fast cell switching at rates ranging from DS1 up to OC12. ATM is a protocol that resides at layer two of the OSI model. As is well known in the art, the layers in the OSI model refer to the seven layer networking reference model developed by the International Standards Organization (ISO). ATM is well suited to become the technology of choice for the Internet backbone because of its ability to support various levels of quality/class of service, its speed and scalability over distance.

The Internet protocol (IP), which is a layer three protocol in the OSI model, may operate over an ATM backbone. However, such operation requires the resolution of various internetworking issues arising between IP and ATM. During the past few years, these issues have been addressed by the Internet Engineering Task Force (IETF), ATM Forum, ITU-T and many industry leaders. As a result, a variety of approaches have been proposed which are suitable for an Internet backbone that employs ATM. In one approach, a so-called IP switch is provided that integrates a conventional router and an ATM switch into a single device.

While IP switches provide many advantages over conventional switching and routing techniques, there remain a number of shortcomings. For example, IP switches do not presently allow a client to specify the data path's quality of service (QoS) since pairs of IP switches multiplex traffic. Moreover, a packet must undergo two router hops across the Internet backbone even when both the source and destination clients belong to the same ATM network. No direct cut-through path between the two clients is available. Additionally, IP switches currently do not provide a mechanism for segmenting a given IP switched network into multiple Intranets having appropriate levels of firewalls located therebetween.

SUMMARY OF THE INVENTION

The present invention provides a communications network that employs IP switches and which overcomes the previously enumerated deficiencies. Specifically, in accordance with one embodiment of the invention, a telecommunications network is provided for establishing communication between at least one originating station and at least one destination station. The network includes a plurality of IP switches for addressing and routing data in accordance with an Internet protocol and an ATM protocol. A server, which is coupled to at least one of the IP switches, receives at least one service attribute requested by the originating station in communication with the IP switch. A network control point (NCP) is employed to provide data, in response to a request from the server, pertaining to the service attribute. At least one address database is associated with each of the IP switches. The address database includes a subset of the data available in the NCP.

In accordance with one aspect of the invention, the address database includes ATM to IP address correspondence data for the various end-point stations coupled to the IP switch. The address database may also include address correspondence data from ATM to the dialed telephone number or to MAC. The service attribute requested by the originating station may include, for example, quality of service requirements and specification of the interface (e.g., ATM, frame relay, private line) between the originating and destination station,

DETAILED DESCRIPTION

To fully convey an appreciation of the present invention, the proceeding discussion will first review select routing techniques for implementing IP over an ATM network.

Classical IP Model—Hop-by-Hop Routing

The most commonly known model supporting IP over an ATM network is referred to as classical IP over ATM. This model maintains traditional IP switching functions on top of ATM and does not require changes in the routing and switching infrastructures. In classical IP, the IP and ATM addressing and routing models are maintained independently. A mapping function is needed to map from an IP address to the corresponding ATM address. That is, traditional overlay IP models such as classical IP view the underlying ATM network as simply another OSI layer two technology. Consequently, classical IP does not take full advantage of the benefits of ATM. Details concerning the classical IP model may be found in *Classical IP Over ATM*, M. Laubach, January, 1994, RFC 1577.

Although both the IP and ATM routing protocols employed in the Classical IP model may determine reachability information for the same hosts, they run independently of one another. For example, IP routers run routing protocols such as RIP and OSPF exchange reachability information pertinent to IP destinations. Likewise, ATM switches run independent protocols such as PNNI to determine ATM network topology and address reachability. Typically, separate IP routers and ATM switches are provided. In fact, many networking scenarios even employ different IP and ATM network topologies.

In the Classical IP model, IP switching is totally decoupled from the ATM network infrastructure even when the originating and target hosts are both directly connected to the same ATM network. In many ATM networks, an IP packet is routed to its final destination in several router hops, each router along the path determining the next hop router to the destination. Each router determines the appropriate next hop router by requiring each router to perform a layer three processing on the IP packet to inspect the destination IP address. The appropriate next hop router is then derived from routing tables resident in the router.

Figure 1:
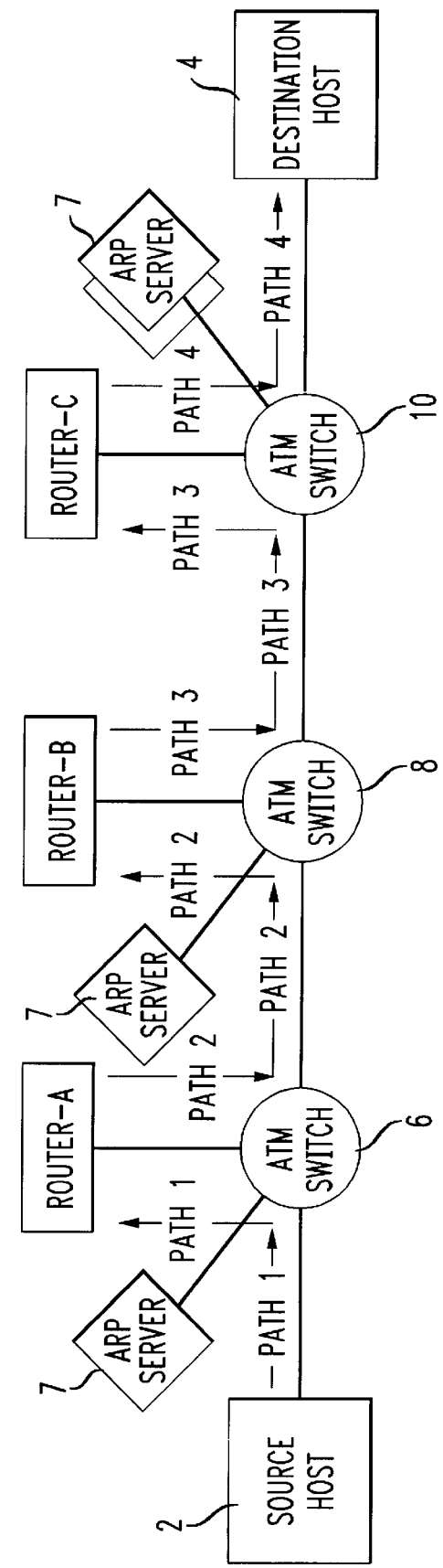
FIG. 1 shows a simplified exemplary illustrating the behavior of the classical IP model.

FIG. 1 shows a simplified exemplary network to illustrate the behavior of the classical IP model when routing packets between two ATM-attached hosts 2 and 4. In this simple scenario, the source host 2 sends a packet to the destination host 4. The destination host 4 is located outside the local IP subnet of the source host 2. In operation, the source host 2 first sends the packet to router A via ATM switch 6 (labeled in FIG. 1 as path 1). To establish path 1 over the ATM network the source host 2 translates the IP address of router A to an ATM address so that a virtual path is built to router A. An address resolution protocol (ARP) server 7 performs the IP to ATM address translation service to all registered clients (i.e., hosts and routers) within a Local IP Subnet. (It should be noted that while the ARP server 7 in FIG. 1 resides on an end-point attached to the ATM switch 6, it may alternatively be a component of either an ATM switch or a router). Source host 2 sends an address resolution request to ARP server 7 to obtain the ATM address corresponding to the IP address of router A, which is located in the same local IP subnet. In turn, the ARP server 7 sends back an address resolution response with the ATM address of router A. Source host 2 thereafter assembles path 1 over the ATM network to the ATM address of router A.

Next, router A determines that the appropriate following hop is to router B. Router A determines the ATM address of router B from ARP server 7 and forwards the packet to router B via ATM switches 6 and 8 (labeled in FIG. 1 as path 2). Similarly, router B forwards the packet through ATM switches 8 and 10 (labeled in FIG. 1 as path 3) to router C, which in turn determines that it is the last hop router on the path to destination host 4. Router C sends the packet to destination host 4 via ATM switch 10 (labeled in FIG. 1 as path 4). It should be noted that this procedure requires three consecutive layer 3, i.e. IP, packet processing steps (one in each of the IP routers), four IP to ATM address mapping steps (one in each of the ARP servers), and four ATM switched virtual path establishment steps along the path between the source and destination hosts 2 and 4.

Classical IP Model—Cut-Through Routing

In situations where large quantities of IP data flow from one end point to another, it is desirable to have a cut-through path to the destination over the ATM network. A cut-through path directly connects the two end points, without traversing intermediate router hops. (It should be noted that each router performs segmentation and reassembly of each IP packet, thus reducing throughput and speed.) For example, since source host 2 knows the IP address of destination host 4, source host 2 could establish a cut-through path to destination host 4 via switches 6, 8, and 10 without traversing routers A, B and C if source host 2 could determine the ATM address of host 4 from its IP address. As a result, end-to-end performance is significantly improved by not traversing routers A, B, and C since multiple stages of layer three packet processing and forwarding are avoided. Cell processing and forwarding at the ATM layer are comparatively faster than at layer two, resulting in reduced delay and increased throughput.

Figure 2:
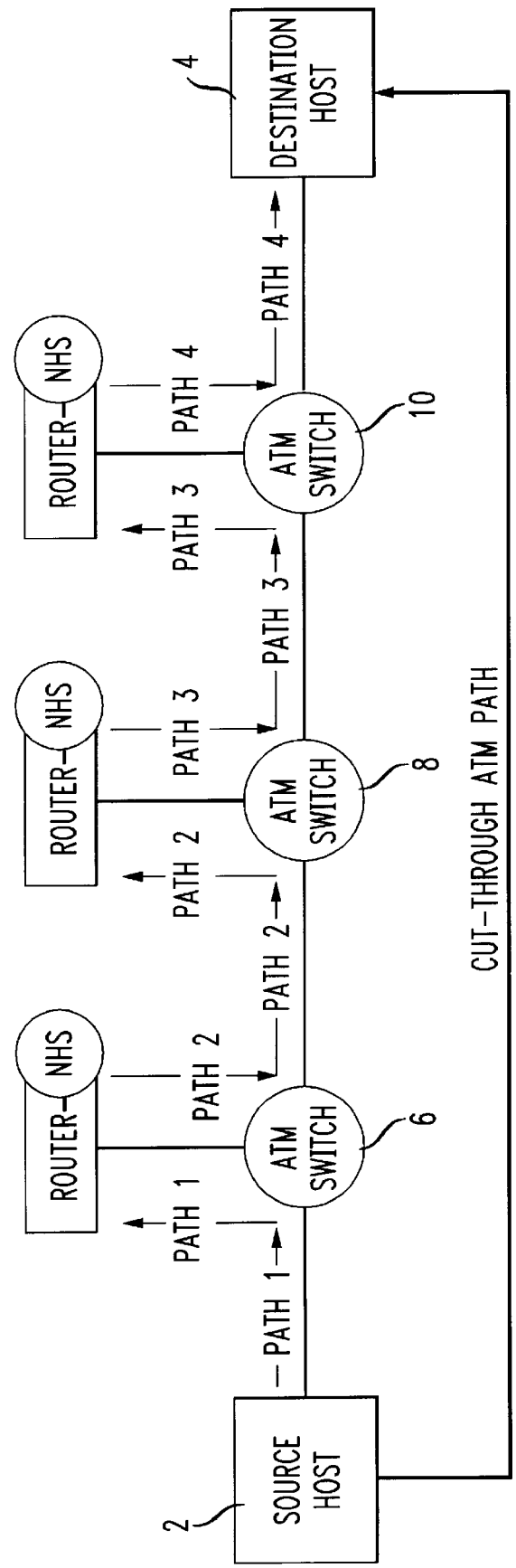
FIG. 2 shows a simplified exemplary network illustrating the classical IP model with a cut-through path

As discussed in *Next Hop Routing Protocol* (*NHRP*), J. Luciani and D. Katz, Internet Draft, the Internet Engineering Task Force (IETF) is currently studying a new address resolution protocol known as NHRP (next hop routing protocol). This protocol maps IP addresses to the corresponding ATM addresses that are located across LISs so that cut-through paths across distinct ATM clouds may be realized. In the NHRP model, each LIS (or multiple LISs) employs a Next Hop Server (NHS), which is analogous to an ARP server. While an ARP server can only communicate with clients located in its own LIS, an NHS can communicate with clients located in its own LIS and with neighboring NHSs which support other LISs. That is, an NHS essentially functions like a series of ARP servers located in a network that are in communication with one another. NHSs determine routes through routing protocols such as RIP and OSPF. The hardware performing the functionality of the NHS may reside in a router, as illustrated in FIG. 2, or alternatively, it may reside on an ATM switch or end-station. In FIGS. 1 and 2 like components are provided with like reference numerals.

An IP host connected to an ATM network that employs NHSs serves as an NHRP Client (NHC). Each NHC registers its IP address and corresponding ATM address within the registration database of its respective NHS. When an NHC wants to transmit its data traffic over a cut-through path rather than over its default (hop-by-hop) path, it requests its NHS to map the IP address of the destination to its corresponding ATM address (note that the destination may be located in a different LIS from the NHC). The NHS receiving this request maintains the corresponding addresses in its database either because the destination is in its own LIS, or because it cached the correspondence between addresses during a previous address resolution request. However, if the NHS does not have the correspondence between addresses in its database, it forwards a request to the next hop NHS. The request is forwarded until the last NHS on the path to the destination is reached. The response containing the appropriate ATM address of the destination then traverses the same path as the request, except in reverse (i.e., paths 1–4 in FIG. 2). Finally, the response is forwarded by the local NHS of the source host so that a virtual path may be developed to the destination without traversing the routers located between the source and destination.

IP Switching

Figure 3:
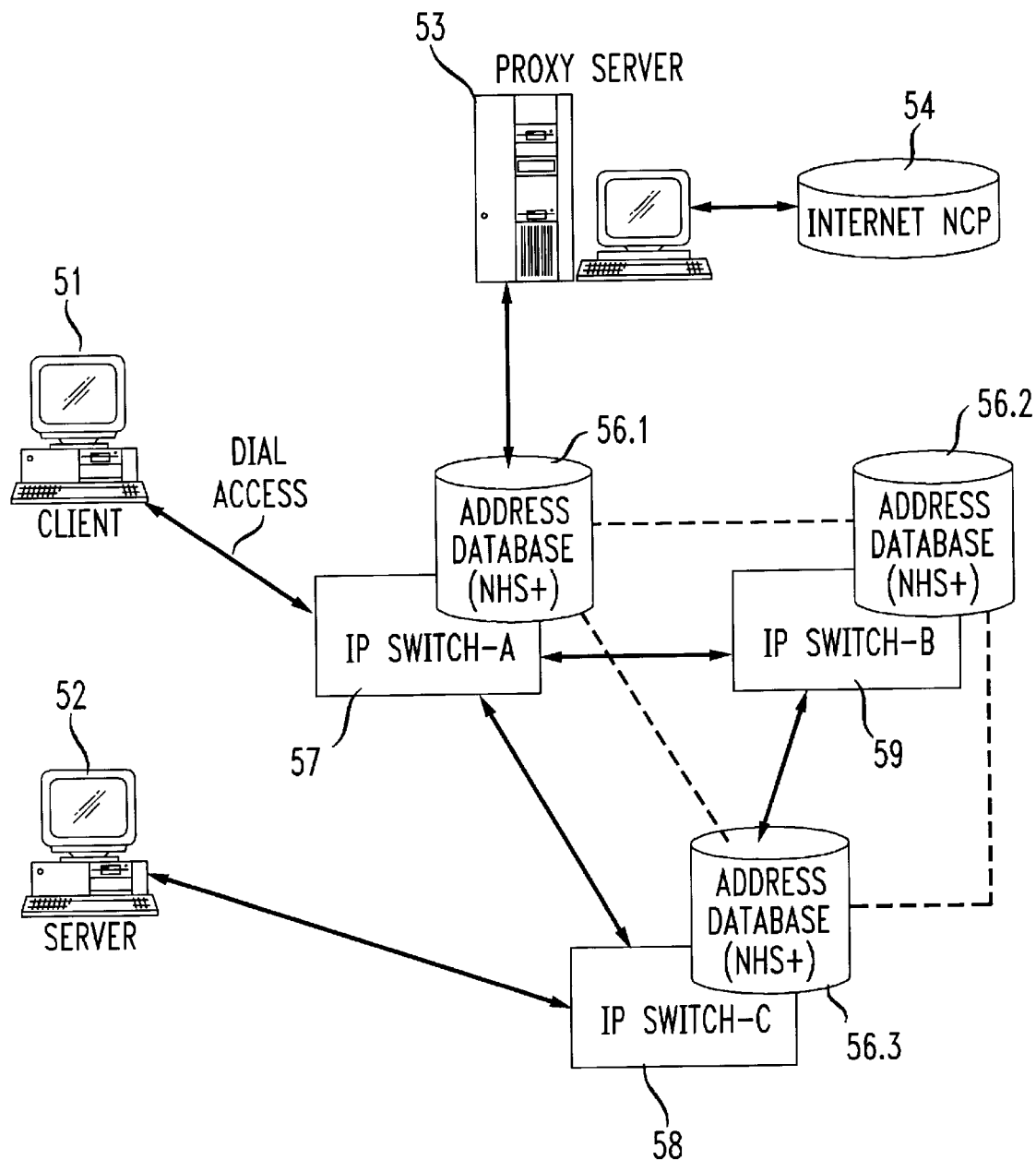
FIG. 3 shows a simplified, exemplary diagram of an IP-switched, ATM network in accordance with the present invention.

Recently, a single device known as an IP switch has been developed. An IP switch integrates a conventional router and ATM switch to route IP over ATM networks much more efficiently than in the traditional model, which employs distinct devices. The IP over ATM model may be substantially simplified if the router and the ATM switch physically reside in the same device, as illustrated in FIG. 3. As previously mentioned, when the functionality of an ATM switch and an IP router reside on separate devices, the ATM switch does not have knowledge pertaining to routing and addressing at the IP layer. In contrast, when the functionality of an ATM switch and an IP router are merged onto the same device, it becomes possible to further integrate routing at the IP level into routing at the ATM level. For example, a perfect topology match is achieved when a layer two node (an ATM switch) is physically integrated into a layer three node (an IP router). Although this configuration does not eliminate the problem of matching an IP address with its corresponding ATM address, the elimination of the topological mismatch creates the opportunity to use a single routing protocol for routing at both the IP and ATM layers. An Illustrative protocol that may serve in this capacity includes I-PNNI (see R. Callon, Relationship Between MPOA and I-PNNI, April 1996, ATM Forum 96-0352), which has been submitted to the ATM Forum to integrate routing at the IPO layer into PNNI. I-PNNI facilitates the bootstrapping and ongoing operation of Internet routing protocols and associated packet forwarding protocols over an ATM network.

In a network employing IP switches, each IP switch pair may be provided with direct connectivity to further simplify the processes of exchanging routing updates and forwarding of packets. Direct connectivity means that each IP switch is connected to every other IP switch without the need for any intermediate switches therebetween. Direct connectivity provides a number of advantages. For example, in a network employing direct connectivity, each host that is connected to one of the IP switches is only two hops away from any other host connected to an IP switch in the same network.

In addition, as a result of direct connectivity each IP switch knows about the IP routing topology of the entire network. Thus, it knows which IP switch is connected to which host.

As well known to one of ordinary skill, direct connectivity may be achieved in a number of different ways. For example, a mesh of virtual paths may be employed, in which each IP switch is connected to every other IP switch with a point-to-point (ptp) virtual path. The switch-to-switch virtual path can be a semi-permanent switched circuit or a permanent virtual circuit. Such a topology yields N-squared point-to-point virtual paths between N switches. Many segments of the point-to-point virtual paths may run over common physical links. Alternatively, direct connectivity may be achieved by using a point-to-multipoint (i.e., multicasting) connection in which one IP switch serves as the so-called root and all other switches serve as so-called leaves. In such a network having N IP switches, only N point-to-multipoint connections are required, thus considerably reducing the number of connections in comparison to a point-to-point topology. Point-to-multipoint connections may be used to transmit unicast packets as well as broadcast packets by having the packet originate at an IP switch serving as one of the leaves. In this case the root IP switch serves as the destination receiving the unicast packet.

IP switching on the Internet Backbone

The current Internet backbone consists of large-scale routers which are interconnected with private lines at a DS3 (45 Mbps) rate. However, in the future it would be advantageous to use an ATM backbone rather than a DS3 backbone. Such an ATM backbone network may employ IP switches since IP switching is optimized for IP routing over an ATM network and thus represents a near ideal switch for the Internet backbone. If IP switching were to be employed in the current Internet, the legacy routers currently employed would be upgraded to IP switches, which, with backbone facilities running the ATM protocol, can operate at rates up to an OC12. The ATM backbone may employ direct connectivity, either point-to-point or point-to-multipoint, both of which require only two hop paths to cross the ATM network and use best effort connections to accommodate the least common denominator quality of service.

FIG. 3 shows a simplified, exemplary diagram of an IP switched ATM network in accordance with the present invention which offers the user or service provider a greater variety of selectable options. The network is accessible via client end-points that may be conveniently classified as either an ATM end-point or a non-ATM endpoint. ATM end-points, such as client 52 in FIG. 3, directly access an IP switch that is located at the periphery of the Internet backbone via an ATM UNI. ATM end-points run IP over ATM using known protocols such as LANE, Classical IP Over ATM, or Multiprotocol Over ATM. Non-ATM end points, such as client 51 in FIG. 3, access an IP switch located at the periphery of the Internet backbone via a non-ATM technology such as Frame-Relay, ISDN or analog lines, all of which run the IP protocol. A protocol adaptation function may be located between the non-ATM end-point and the IP switch. Alternatively, the peripheral IP switch may directly support non-ATM interfaces.

As seen in FIG. 3, an Internet attached server 53 functions as an agent or proxy through which a client may request special services by allowing the client or service provider to specify client characteristics or desired service attributes. The proxy server 53 is typically a Web-server that is administered by the Internet service provider. The client may access the proxy server 53 via a Web-browser that is secured by a password. Once access is provided, the client may conveniently select the desired service attribute or attributes from a list of attributes. The client specifies to the proxy server 53 one or more desired service attributes pertaining to the quality of service. For purposes of illustration, service attributes include the type of access requested by the client such as ATM or non-ATM (dial, ISDN, etc.) and Quality of Service (QOS) requirements, which may be defined per application, destination, time-of-day, and/or per port. Additional service attributes that may be specified via the proxy server 53 include the IP address of the host (if known), the IntraNet name, the host name and billing address, a credit card number or any special filters.

The proxy server 53 also may be employed to appropriately configure the end-point. For example, the proxy server 53 may provide to the user the NHS address or IP switch address to which the end-point should connect.

As seen in FIG. 3, the proxy server 53 functions in cooperation with an Internet network control point (NCP) 54. The NCP 54, which is analagous to known network control points used in telephone networks that employ intelligent call processing, is the master database of the network which stores end-point information such as the correspondence between ATM, IP and MAC addresses, QoS requirements, special security filters, and billing properties. End-points can access the NCP 54 via the proxy server 53 to retrieve information and update the database as appropriate. That is, the proxy server 53 functions as a client interface to the NCP 54. The NCP 54 also may be updated in an automatic fashion by the individual IP switches in the network, such as when an endpoint registers or unregisters an IP to ATM address correspondence or a particular QoS.

The individual IP switches within the Internet backbone each have an address database 56 that contains essentially a subset of the data in the NCP 54. At a minimum, the address databases 56 contain the correspondence between the ATM and IP addresses for their respective end-points. In contrast to an NHS, which only supports an ATM end-point, the address databases 56 support both ATM and non-ATM endpoints. Accordingly, the address databases 56 serve as NHS's with enhanced functionality.

The address databases 56 may be employed not only to construct an ATM cut-through across the Internet backbone, but also to specify a desired quality of service across the Internet backbone. If both the source and destination end-points access the backbone via ATM, a cut-though is feasible, assuming the source end-point can map the IP address of the destination end-point to its ATM address.

The address database may also perform additional functions such as: receiving updated IP-ATM address registrations from clients or other address databases; receiving IP-ATM address deregistration requests from clients or other address databases; adding or deleting IP to ATM address correspondences from the database; receiving address queries from clients or other address databases; forwarding address query requests to clients or other address databases; forwarding address query responses; and receiving provisioned end-point information updates from the Internet NCP.

The address databases may be implemented in any convenient manner. Two possible implementations are a fully distributed implementation and a fully duplicated implementation. In the fully distributed approach, each IP switch only maintains an address database for those end-points that access the Internet at that particular IP switch. Accordingly, there is no need for synchronization among different address databases in different IP switches. For example, when a source end-point sends an address query to its IP switch regarding a destination end-point and the IP to ATM address correspondence is not found in the queried IP switch, the switch will forward the request only to the IP switch responsible for the destination end-point. In a fully distributed arrangement, the Internet NCP serves as the master database that stores all provisioned information for the network, including the IP to ATM address correspondences. When a change in the address database of an IP switch occurs (due to a host disconnecting from the IP switch, for example), the same change is forwarded to the Internet NCP to update the master database. Similarly, when the Internet NCP is modified by the service provider or the user, the appropriate individual address database(s) within the IP switch(es) will be updated accordingly.

If the address databases 56 are configured in a fully-duplicated arrangement, each IP switch maintains the database for all the end-points. When a new database entry is registered with a given IP switch, that registration is sent to all other IP switches. Accordingly, the address databases of all the IP switches are identical. That is, while the Internet NCP contains the master copy of the database, each IP switch maintains its own complete copy of the database. Similar to the fully distributed arrangement, if an IP switch makes a change in its database, the change will be reflected in all the other address databases, including the master database of the Internet NCP. Likewise, if a change is made to the Internet NCP database, it will be reflected in all the other address databases.

Figure 4:
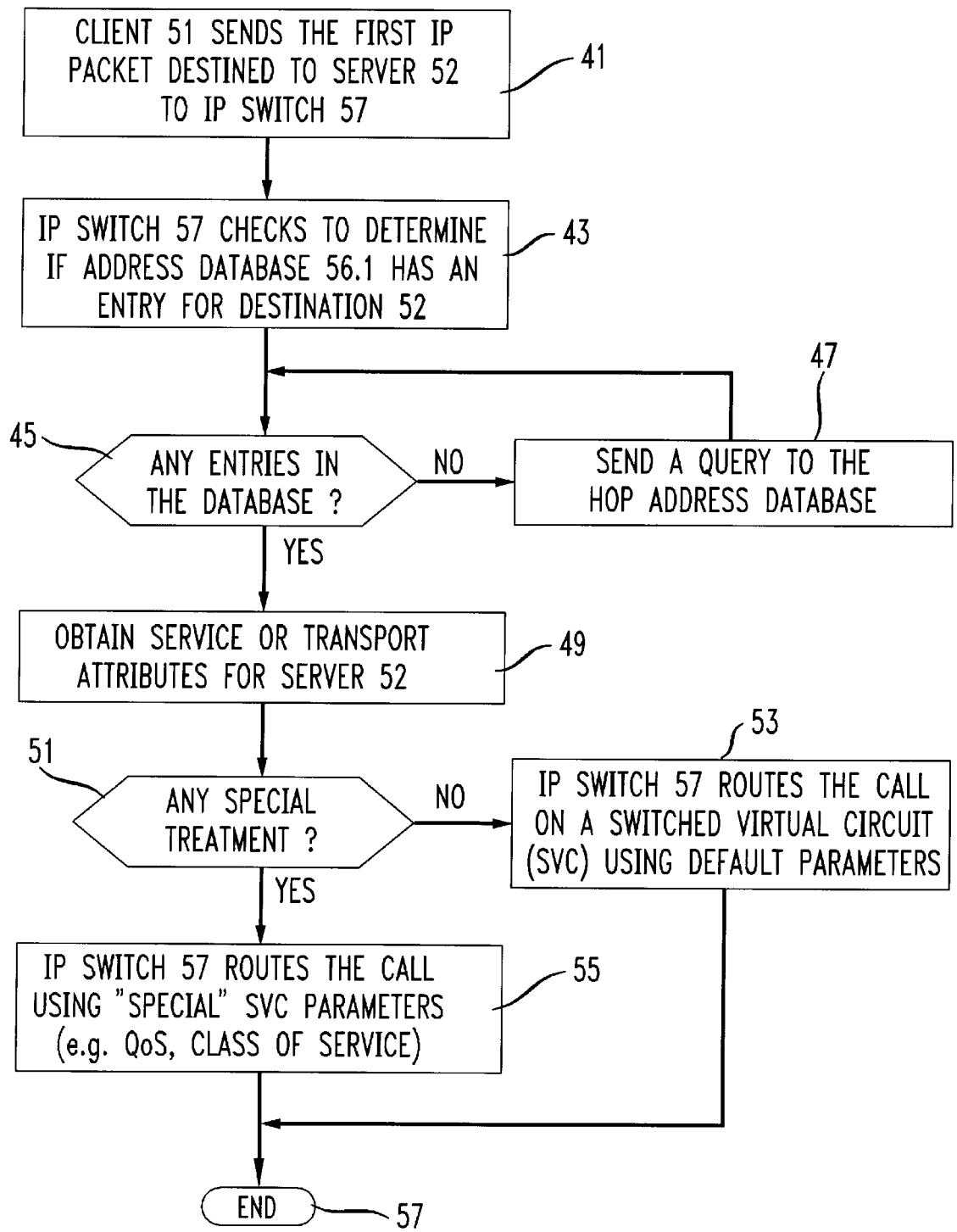
FIG. 4 shows a flow chart illustrating the steps performed when a client initiates communication with a server via with an address database that is arranged in a fully distributed manner.

FIG. 4 shows a flow chart illustrating the steps performed when client 51 initiates communication with server 52 with an address database that is arranged in a fully distributed manner. In step 41, the client 51 sends to IP switch 57 the first IP packet addressed to server 52. In step 43, IP switch 57 determines if its address database 56 has an entry for server 52. If IP switch 57 does not have such an entry, it sends a query to the next hop database in step 47 to determine the address of server 52. Once IP switch 57 receives the appropriate address, it then obtains the requested service attributes for server 52 in step 49. In step 51, IP switch 57 accesses whether the requested service attributes require any special treatment. If they do not, in step 53 IP switch 57 routes the packet on a switched virtual circuit using default parameters. If special treatment is required, in step 55 IP switch 57 routes the call in conformance with the requested service parameters.

We claim:

1. A telecommunications network for establishing communication between at least one originating station and at least one destination station, comprising:
   a plurality of IP switches for addressing and routing data in accordance with an Internet protocol and an ATM protocol;
   a server, coupled to at least one of the IP switches, for receiving at least one service attribute requested by an originating station in communication with the IP switch;
   a network control point (NCP) for providing data in response to a request from the server for providing said at least one service attribute;
   at least one address database associated with each of the IP switches, said at least one address database including a subset of the data available in the NCP.

2. The network of claim 1 wherein said address database includes ATM to IP address correspondence data for end-point stations coupled to the IP switch with which said address database is associated.

3. The network of claim 1 wherein said address database includes ATM to telephone number address correspondence data for end-point stations coupled to the IP switch with which said address database is associated.

4. The network of claim 1 wherein said address database includes ATM to MAC address correspondence data for end-point stations coupled to the IP switch with which said address database is associated.

5. The network of claim 1 wherein said address databases are implemented in a fully distributed manner.

6. The network of claim 1 wherein said address databases are implemented in a fully duplicated manner.

7. The network of claim 6 wherein said address database incorporates a next hop server (NHS) address correspondence data for routing the IP packet to the destination station.

8. The network of claim 1 wherein said data provided by the NCP pertaining to an endpoint destination is selected from the group consisting of end-point information, quality of service requirements, security filters, and billing arrangements.

9. The network of claim 1 wherein said server receives the service attribute from a station in accordance with an IP protocol.

10. The network of claim 1 wherein said service attributes include a specification of an interface for establishing a connection between an originating station and a destination station.

11. The network of claim 10 wherein said interface is selected from the group consisting of an ATM interface, an analog interface, a digital interface, a frame relay interface and a private line interface.

12. The network of claim 11 wherein said digital interface is an ISDN interface.

13. The network of claim 1 wherein said service attributes include quality of service requirements.

14. The network of claim 13 wherein said quality of service requirements are specifiable on a user-application basis.

15. The network of claim 13 wherein said quality of service requirements are specifiable on a time-of-day basis.

16. The network of claim 1 wherein said originating station has a dial interface and said destination station has an ATM interface so that a cut-through path is established between an IP switch associated with said originating station and said destination station.

17. The network of claim 1 wherein said originating station has an ATM interface and said destination station has a dial interface so that a cut-through path is established between said originating station and an IP switch associated with said destination station.

18. The network of claim 1 wherein said originating station and said destination station have an ATM interface so that a cut-through path is established between said originating station and said destination station.

19. The network of claim 1 wherein said originating station has a dial interface and said destination station has a dial interface so that a cut-through path is established between an IP switch associated with said originating station and an IP switch associated with said destination station.

20. A method for establishing communication between at least one originating station and at least one destination station over a network including a plurality of IP switches for addressing and routing data in accordance with an Internet protocol and an ATM protocol, said method comprising the steps of:

receiving an IP packet from the originating station addressed to the destination station;

identifying an entry in an address database, that includes a subset of data available in a Network Control Point (NCP), for providing data in response to a request for information, the database containing address correspondence data for routing the IP packet to the destination station;

identifying, by launching an inquiry to the NCP, at least one service attribute associated with transmission of the IP packet to the destination station;

routing the IP packet to the destination station in accordance with the service attribute.

21. The method of claim 20 wherein the step of identifying an entry in an address database comprises the step of transmitting a query to a next hop IP switch requesting said address correspondence data for routing the IP packet to the destination station.

22. The method of claim 20 wherein said service attribute includes a default parameter.

23. The method of claim 20 wherein said service attribute is requested by the originating station.

* * * * *